(12) United States Patent
Coleman et al.

(10) Patent No.: US 10,316,837 B2
(45) Date of Patent: Jun. 11, 2019

(54) PISTON SEAL ASSEMBLY WITH CONTROLLED LEAKAGE

(71) Applicant: Westport Power Inc., Vancouver (CA)

(72) Inventors: Timothy S. Coleman, Vancouver (CA); Kamal Hatami Aghdam, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 114 days.

(21) Appl. No.: 15/300,249

(22) PCT Filed: Mar. 25, 2015

(86) PCT No.: PCT/CA2015/050231
§ 371 (c)(1),
(2) Date: Sep. 28, 2016

(87) PCT Pub. No.: WO2015/143559
PCT Pub. Date: Oct. 1, 2015

(65) Prior Publication Data
US 2017/0146010 A1 May 25, 2017

(30) Foreign Application Priority Data
Mar. 28, 2014 (CA) ..................... 2847760

(51) Int. Cl.
*F16J 9/06* (2006.01)
*F04B 53/02* (2006.01)
*F16J 9/14* (2006.01)

(52) U.S. Cl.
CPC ............ *F04B 53/02* (2013.01); *F16J 9/063* (2013.01); *F16J 9/145* (2013.01)

(58) Field of Classification Search
CPC ........ F16J 9/00; F16J 9/06; F16J 9/064; F16J 9/10; F16J 9/12
See application file for complete search history.

(56) References Cited

U.S. PATENT DOCUMENTS 2,785,029 A 3/1957 Davis
2,917,353 A * 12/1959 Fuhrmann ............... F16J 9/067
267/1.5

(Continued)

FOREIGN PATENT DOCUMENTS

CA 975019 A1 9/1975
CN 2055883 U 4/1990
(Continued)

OTHER PUBLICATIONS

Extended European Search Report in corresponding EP Application, dated Feb. 20, 2018.
(Continued)

*Primary Examiner* — Gilbert Y Lee
(74) *Attorney, Agent, or Firm* — Carie C. Mager

(57) ABSTRACT

A piston seal assembly is disclosed comprising a seal and a seal energizer which supports the seal. The piston seal assembly comprises one component that is designed to position the seal energizer in a fixed axial position within the piston groove. In one embodiment, the seal energizer has the shape of a split ring with at least one of its lateral surfaces shaped to position the energizer in a fixed position within a piston groove. In other embodiments the piston seal assembly comprises a spacer that is positioned next to the seal energizer within the piston groove and is designed to position the seal energizer in a fixed axial position. The piston seal assembly can comprise a seal that has a portion which protrudes between the seal energizer and the piston groove wall such that it positions the seal energizer in a fixed axial position within the piston groove.

20 Claims, 11 Drawing Sheets

(56) References Cited

U.S. PATENT DOCUMENTS

| | | | |
|---|---|---|---|
| 3,000,678 A * | 9/1961 | Gunther | F16J 9/063 |
| | | | 277/473 |
| 3,329,421 A | 7/1967 | Wiemann | |
| 6,176,492 B1 | 1/2001 | Sawai | |
| 2002/0145259 A1 | 10/2002 | Chalk | |

FOREIGN PATENT DOCUMENTS

| | | | |
|---|---|---|---|
| CN | 1205393 A | 1/1999 |
| CN | 2340919 Y | 9/1999 |
| CN | 1479028 A | 3/2004 |
| CN | 2692363 Y | 4/2005 |
| CN | 201475308 U | 5/2010 |
| CN | 101813034 A | 8/2010 |
| CN | 102367868 A | 3/2012 |
| CN | 202719131 U | 2/2013 |
| EP | 0192114 A2 | 8/1986 |
| GB | 2239925 A | 7/1991 |
| WO | 8912191 A1 | 12/1989 |

OTHER PUBLICATIONS

Office Action issued by SIPO dated Nov. 29, 2017 in connection with co-pending Chinese Application No. 201580027811.3 (English Translation).

Search Report issued by SIPO dated Nov. 29, 2017 in connection with co-pending Chinese Application No. 201580027811.3 (English Translation).

International Search Report and Written Opinion of the International Searching Authority, dated Jul. 8, 2015.

\* cited by examiner

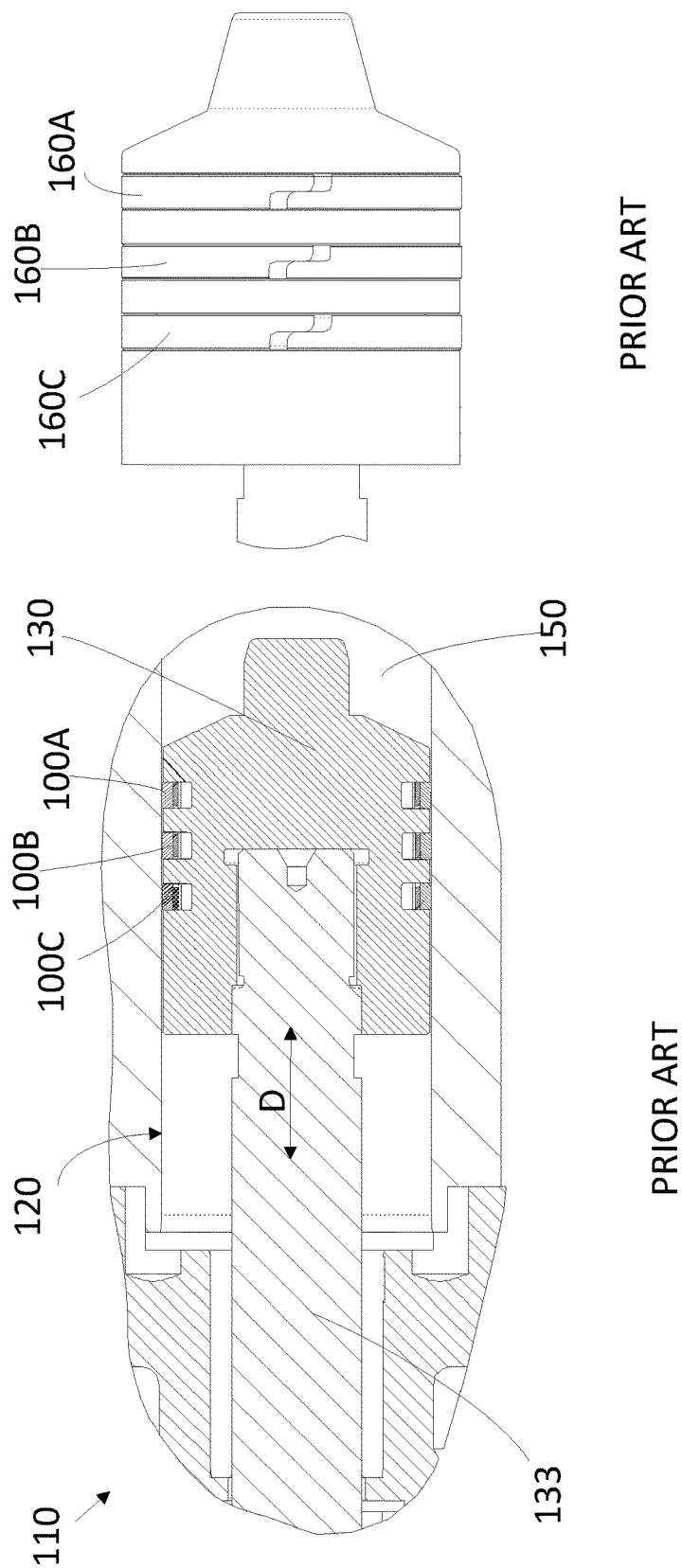

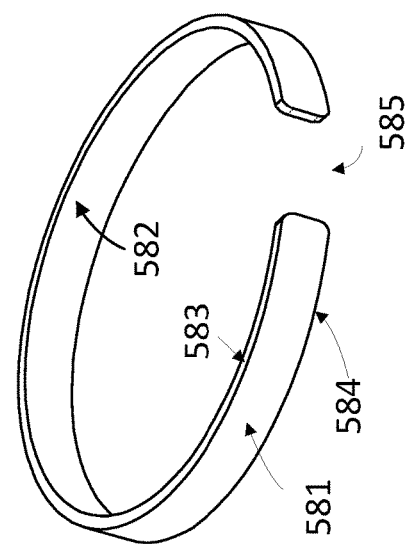
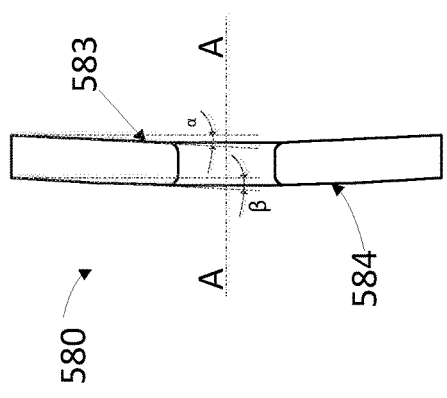
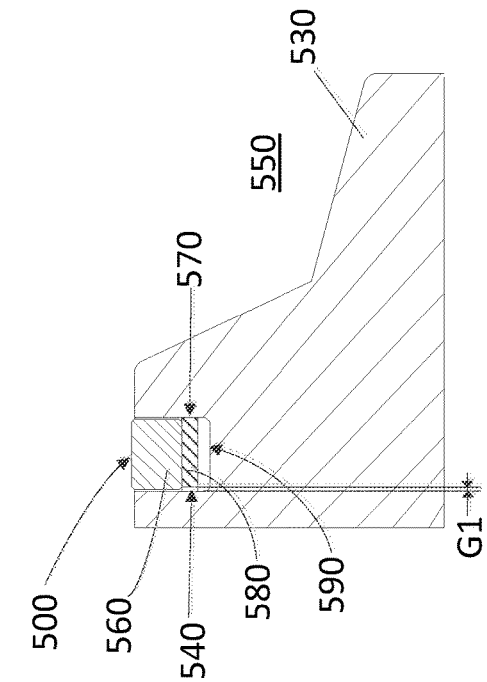
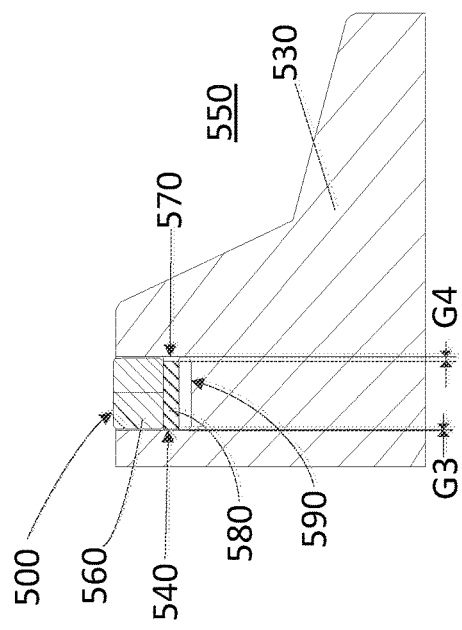

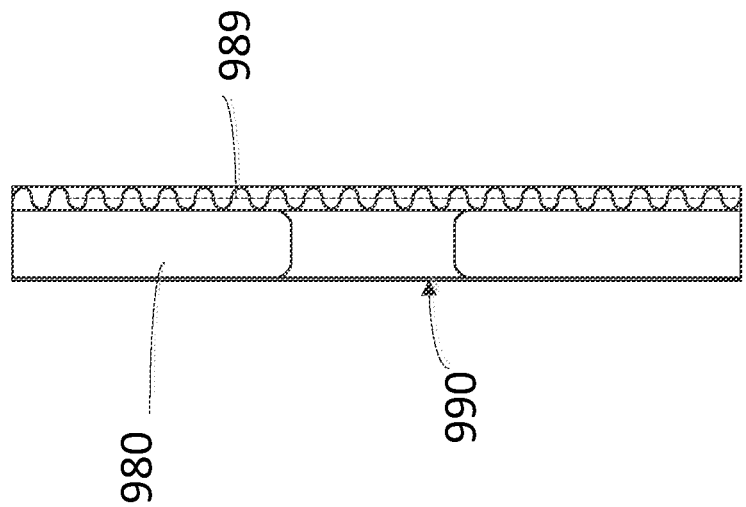
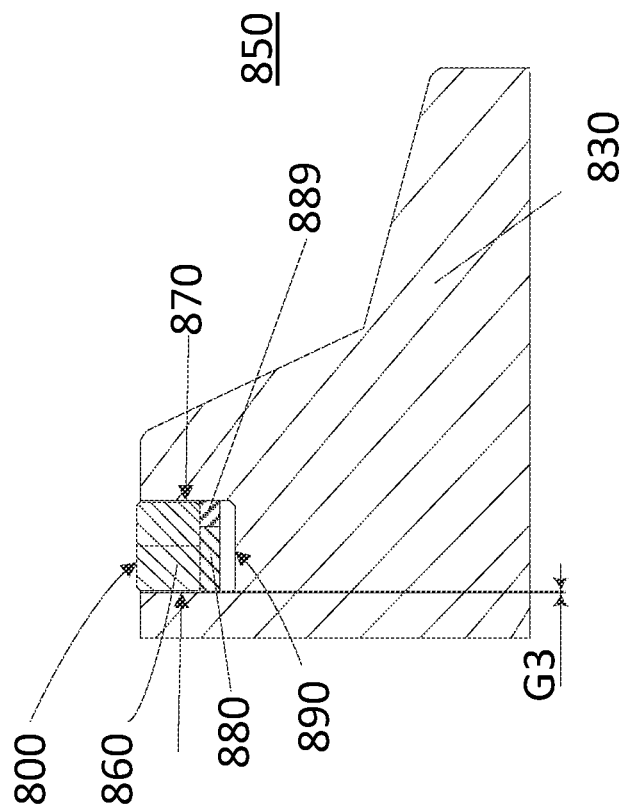
FIGURE 12
FIGURE 11

PISTON SEAL ASSEMBLY WITH CONTROLLED LEAKAGE

TECHNICAL FIELD

The present disclosure relates to a piston seal assembly with controlled leakage.

BACKGROUND

Pistons which reciprocate within a cylinder bore are well known in the art and have been long used for pumps, hydraulic drives, engines, pneumatic drives and other hydraulic or pneumatic machines delivering different fluids at increased pressure. When the piston is moving within the cylinder, a piston seal assembly is employed for dynamic sealing to prevent fluid from leaking between the piston and the cylinder walls.

Piston seals are subjected to substantive wear due to the piston's movement within the cylinder bore and sometimes they fail due to excessive wear and/or due to the stress caused by the pressure exerted on the seal by the fluid being compressed. Such operating conditions can be even more challenging in the case of high pressure reciprocating pumps and/or in the case of pumps handling cryogenic fluids.

An example of such a reciprocating pump is a pump used to deliver a liquefied gaseous fuel from a cryogenic vessel to a gaseous-fuelled internal combustion engine. Such pumps can handle fluids at relatively high pressures, around 4600 psi, and at low temperatures, for example at around −130 degrees Celsius and lower. It is difficult to provide an effective seal for the piston of such a pump especially because the material of the seal has to withstand the low temperatures of the pumped fluid and the high compression stresses acting on the seal. Also, the different contraction coefficients of the materials from which the pump components and the seals are made can result in gaps being formed between the piston seals and the cylinder wall allowing fluid to leak from the compression chamber past the piston seal to the low pressure side of the pump.

For all the reciprocating pumps in general, seal wear due to the reciprocating movement of the piston is a problem that needs to be addressed. In the past, split seals have been used to address the seal wear problem. Split seals have the shape of a ring having a cut which allows it to be installed on the piston and more importantly it allows the seal to expand to compensate for the seal wear. For maintaining the contact between the seal and the pump cylinder wall a seal energizer is provided for supporting the seal and pushing it towards the cylinder wall. The seal energizer can be a metal ring that is positioned underneath the seal and forms together with the seal a piston seal assembly that is placed in a piston groove. The seal energizer is split transversally such that there is a gap between the free ends of the ring which provides for an easier installation of the seal energizer in the piston groove and provides more elastic force for pushing the seal towards the cylinder wall when the seal assembly is installed in the piston groove.

Generally there is a clearance gap between the seal energizer and the lateral walls of the piston groove where the seal assembly is positioned due to manufacturing tolerances. The dimensions of the gap can vary, but it can be in some cases larger than 0.15 mm. The size of the gap between the seal energizer and the piston groove can be controlled only through tight manufacturing tolerances and such gap represents a potential seal leak path which can affect the life span of the seal. With the known construction of seal energizers the seal leak path area can vary depending on the manufacturing tolerances of the seal energizer and of the piston groove and depending on the pump's operating conditions.

Furthermore, if several seal assemblies, each comprising a seal and a seal energizer, are mounted in series for sealing the piston as it reciprocates within the pump cylinder, it has been observed that some seals show substantially more wear than others with at least one random seal failing after some time. This can be explained by the fact that the pressure drop across each seal varies. The pressure drop across each seal depends on the size of the leak path area through the seal, and seals with the smallest leak path area experience the greatest pressure drop due to the highest resistance to fluid pressure and will wear faster. The replacement of worn seals requires taking the apparatus out of service, removing the piston and replacing the seals.

Accordingly, there is a desire to continually improve the life of the piston seals to increase the time between service intervals, improving seal wear consistency over time.

SUMMARY

A piston seal assembly is disclosed for sealing between a piston and a cylinder bore, the piston seal assembly being disposed in a circumferential piston groove and comprising a seal and a seal energizer. The seal energizer comprises an outer circumferential surface and an inner circumferential surface and a first lateral surface and a second lateral surface adjoining the outer and inner circumferential surfaces, the outer circumferential surface of the seal energizer supporting the seal in the piston groove. A component of the piston seal assembly is designed to position the seal energizer in a fixed axial position within the circumferential piston groove. In preferred embodiments, at least one of the first lateral surface and the second lateral surface of the seal energizer is shaped to position the seal energizer in a fixed axial position within the piston groove. In preferred embodiments the seal energizer is a split ring.

The first lateral surface of the seal energizer is provided with at least one tab extending in a direction perpendicular to the first lateral surface, and in preferred embodiments the first lateral surface is provided with a plurality of tabs, which are positioned at predetermined spaced intervals on the first lateral surface.

In some other embodiments, both the first and the second lateral surface of the seal energizer are provided with at least one tab extending in a direction perpendicular to the first lateral surface and respectively to the second lateral surface. Preferably both the first and the second lateral surface of the seal energizer are provided with a plurality of tabs extending in a direction perpendicular to the first and respectively the second lateral surface and the tabs are positioned at predetermined spaced intervals on the first and respectively the second lateral surface.

In preferred embodiments, there are an equal number of tabs associated with the first lateral surface and the second lateral surface. The axis of each of the tabs on the first lateral surface which is perpendicular to the circumferential direction of the seal energizer is aligned with the axis of a corresponding tab on the second lateral surface.

In some embodiments, the tabs have a rectangular shape or a semicircular shape.

In some other embodiments, the tabs are separate from the first or second surface of the seal energizer and are inserted into corresponding notches formed in the first or second lateral surface of the seal energizer. The tabs can be for example injection molded into these notches. The tabs can be of the same material as the seal energizer or they can be made of a softer, more elastic material, for example an elastomeric or a plastic material.

In yet another embodiment of the piston seal assembly, the first and the second lateral surfaces of the seal energizer are curved. The first lateral surface of the seal energizer can have a different curvature than the second lateral surface.

In some other embodiments, the first lateral surface of the seal energizer is provided with at least one recess, and preferably the first lateral surface of the seal energizer is provided with a plurality of recesses positioned at predetermined spaced intervals on the first lateral surface.

In some embodiments, the piston seal assembly comprises a seal energizer that is made of at least two parts which share a common longitudinal axis and are positioned next to each other in the circumferential piston groove. In these embodiments, the two parts are designed to form the outer circumferential surface, the inner circumferential surface, the first lateral surface and the second lateral surface of the energizer and at least one of the first or second lateral surface of the seal energizer is shaped to position the seal energizer in a fixed axial position within the circumferential piston groove. For example, the first lateral surface formed by one part of the seal energizer is provided with at least one tab extending in a direction perpendicular to the first lateral surface. In other embodiments, one of the two parts of the seal energizer is made of an elastomeric or plastic material and it is dimensioned to position the seal energizer in a fixed axial position within the circumferential piston groove.

In other embodiments the seal piston assembly comprises a seal which has a portion which protrudes between the seal energizer and the wall of the circumferential piston groove and this portion of the seal is dimensioned to position the seal energizer of the seal piston assembly in a fixed axial position within the circumferential piston groove.

In some other embodiments, the piston seal assembly also comprises a spacer that is positioned within the circumferential piston groove between the seal energizer and a wall of the piston groove and the spacer is designed to position the seal energizer in a fixed axial position within the piston groove. The spacer can be made of an elastomeric or plastic material.

In preferred embodiments, when the piston seal assembly comprises a seal energizer having a first lateral surface provided with a plurality of tabs positioned at predetermined spaced intervals, the seal energizer is located in the piston groove with the tabs being in contact with a wall of said groove which is closer to a compression chamber defined in the cylinder bore.

The piston seal assembly described here can be used for sealing between the piston and the cylinder bore of a pump which compresses cryogenic fluids at pressures higher than 3000 psi.

A seal energizer is disclosed for supporting a seal in a circumferential piston groove of a piston that is reciprocable in a cylinder, the seal energizer comprising an outer circumferential surface and an inner circumferential surface and a first lateral surface and a second lateral surface adjoining the outer and inner circumferential surfaces. At least one of the first lateral surface and the second lateral surface is shaped to position the seal energizer in a fixed axial position within the circumferential piston groove. Preferably the seal energizer has the shape of a split ring.

The first lateral surface of the seal energizer is provided with at least one tab extending in a direction perpendicular to the first lateral surface and in preferred embodiments the first lateral surface of the seal energizer is provided with a plurality of tabs extending in a direction perpendicular to the first lateral surface, the tabs being positioned at predetermined spaced intervals on the first lateral surface.

The some other embodiments, the second lateral surface of the seal energizer is also provided with at least one tab extending in a direction perpendicular to said second lateral surface and preferably the second lateral surface of the seal energizer is provided with a plurality of tabs extending in a direction perpendicular to the second lateral surface and being positioned at predetermined spaced intervals on the second lateral surface.

In such embodiments where both the first and the second lateral surface are provided with a plurality of tabs, preferably there are an equal number of said tabs associated with the first lateral surface and the second lateral surface. The axis of each of the tabs on the first lateral surface in a direction perpendicular to a circumferential direction of the seal energizer can be aligned with an axis of a corresponding tab from the tabs on the second lateral surface.

In some embodiments disclosed here the tabs have a rectangular shape or a semicircular shape.

In yet some other embodiments of the present seal energizer the tabs are separate from the first or second surface of the seal energizer and are inserted into corresponding notches located on the first or second lateral surface of the seal energizer. The tabs can be for example injection molded into these notches. The tabs can be made of the same material as the seal energizer or of a softer, more elastic material, for example an elastomeric or a plastic material.

In another embodiment of the present seal energizer the first and second lateral surfaces of the seal energizer are curved. The first lateral surface can have a different curvature than the second lateral surface.

In other embodiments disclosed here the first lateral surface of the seal energizer is provided with at least one recess and preferably the first lateral surface of the seal energizer is provided with a plurality of recesses positioned at predetermined spaced intervals on the first lateral surface.

The seal energizer can be made of at least two parts which share a common longitudinal axis and are positioned next to each other in the circumferential piston groove to thereby form an outer circumferential surface, an inner circumferential surface, a first lateral surface and a second lateral surface of the seal energizer. At least one of the first and second lateral surfaces of the seal energizer is shaped to position the seal energizer in a fixed axial position within the piston groove. For example, the lateral surface formed by one part of the seal energizer is provided with at least one tab extending in a direction perpendicular to the first lateral surface. In some other embodiments, one of the parts of the seal energizer is made of an elastomeric or plastic material and it is dimensioned to position the seal energizer in a fixed axial position within the piston groove.

BRIEF DESCRIPTION OF THE DRAWINGS

FIG. 1 is a schematic cross-sectional representation of a reciprocating pump having a piston comprising a series of piston seal assemblies;

FIG. 2 is a view of the piston illustrated in FIG. 2 showing the series of S-cut seals;

FIG. 8A is a view of a seal energizer according to a fourth embodiment of the present disclosure and FIGS. 8B and 8C illustrate two cross-sections through a piston seal assembly comprising the seal energizer illustrated in FIG. 8A, positioned in a piston groove;

FIG. 11 shows a schematic cross-sectional representation of a piston seal assembly according to another embodiment of the present disclosure, comprising a spacer which is positioned next to the seal energizer within the piston groove;

FIG. 12 shows a view of another embodiment of the present disclosure which comprises a seal energizer and a spring positioned next to the seal energizer within a piston groove.

DETAILED DESCRIPTION

Figure 3:
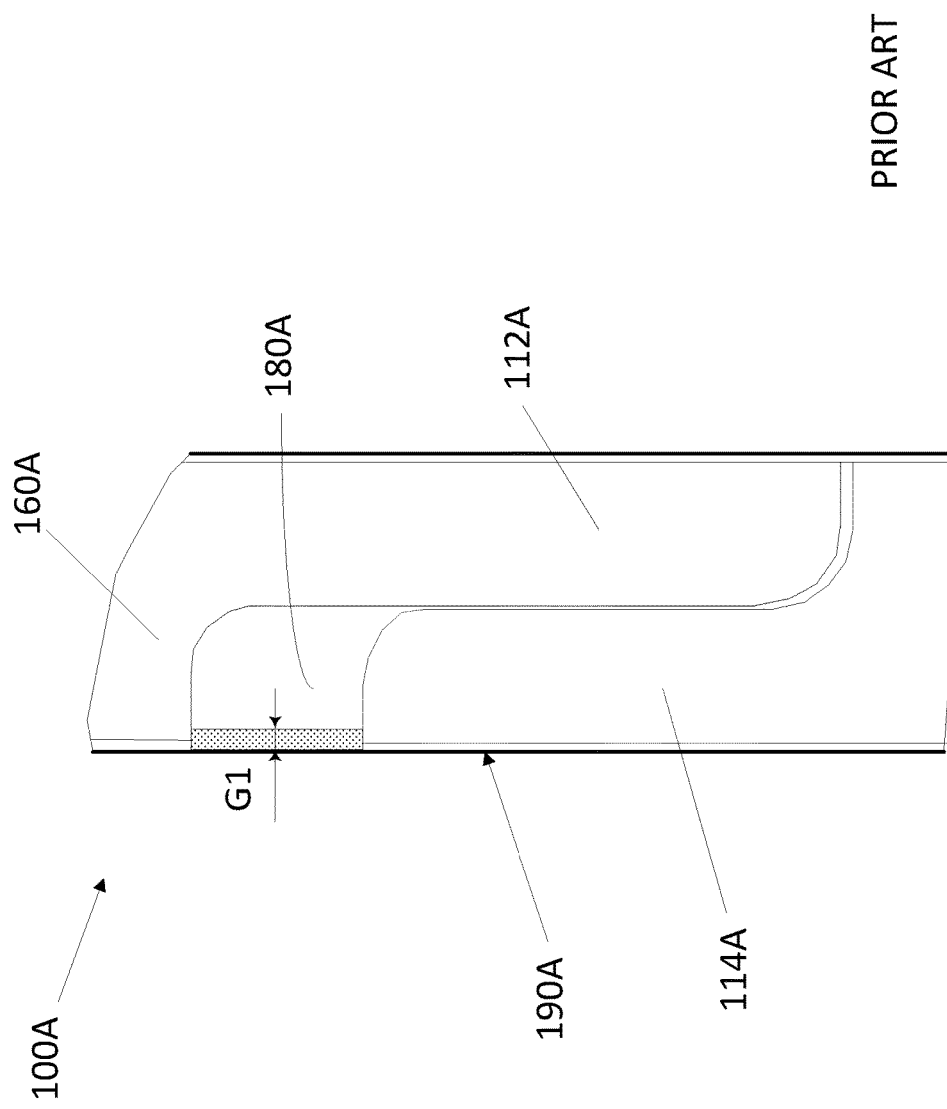
FIG. 3 is a view of outer circumferential surface of a piston seal assembly illustrating the relative position between an S-cut seal and an underlying energizer within a piston groove and illustrating one of the possible leak paths through the seal assembly.

The disclosed apparatus was developed for piston seals for reciprocating cryogenic piston pumps which have some particular characteristics which require improved design features. The improved seal assembly is described herein in the context of this application. Nevertheless the teachings of the disclosed apparatus can be applied to improve seal life for many different applications for piston seal assemblies that employ a piston ring seal and seal energizer.

FIG. 1 illustrates a reciprocating pump 110, known in the prior art, which comprises a cylinder bore 120, defined by the body of the pump, and a piston 130 which is actuated by an actuating mechanism (not illustrated) through a shaft 133 such that it has a reciprocating movement D within cylinder bore 120. When piston 130 moves in one direction it draws in fluid into compression chamber 150 through the pump's intake port, during the intake stroke, and when piston 130 moves in the opposite direction, it compresses the fluid within compression chamber 150 during the compression stroke of the pump.

Piston 130 comprises a series of seal assemblies 100A, 100B and 100C. Each seal assembly comprises a seal and a seal energizer supporting the seal, which are better illustrated in FIGS. 3, 4A, 4B and 4C. Each seal can have a split configuration as illustrated FIG. 2 and further detailed in FIG. 3. The type of seal energizer illustrated in FIGS. 1 and 3 is known in the prior art and is generally provided for seal assemblies comprising a split seal, more commonly known as an "S-cut" seal, to allow the seal to remain in close proximity to the cylinder wall when the outer circumferential surface is worn, thereby maintaining a good seal between the piston and the cylinder wall. Each split seal 160A, 160B and 160C, has two overlapping free end segments. FIG. 3 illustrates a view of the outer circumferential surface of seal assembly 100A which comprises seal 160A and underlying seal energizer 180A. Seal 160A has two overlapping end segments, a first end segment 112A and a second end segment 114A, each having a width that is smaller than the width of the main body of the seal. Seal 160A is supported by seal energizer 180A and the seal assembly formed by the seal and the seal energizer is located in a circumferential piston groove 190A, formed in the piston, as better illustrated in FIGS. 4A, 4B and 4C.

Figure 4B:
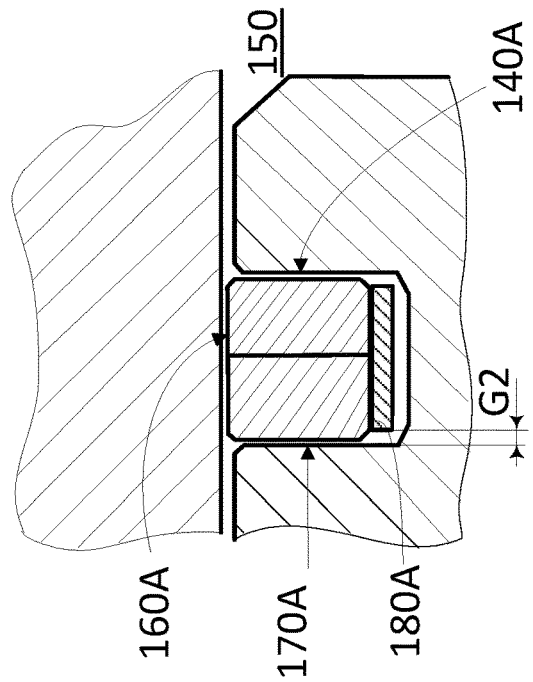
FIGS. 4A, 4B and 4C are schematic cross-sectional representations of a piston seal assembly located in a piston groove of a reciprocating pump, which illustrate the different axial positions of the seal energizer within the piston groove.
Figure 4A:
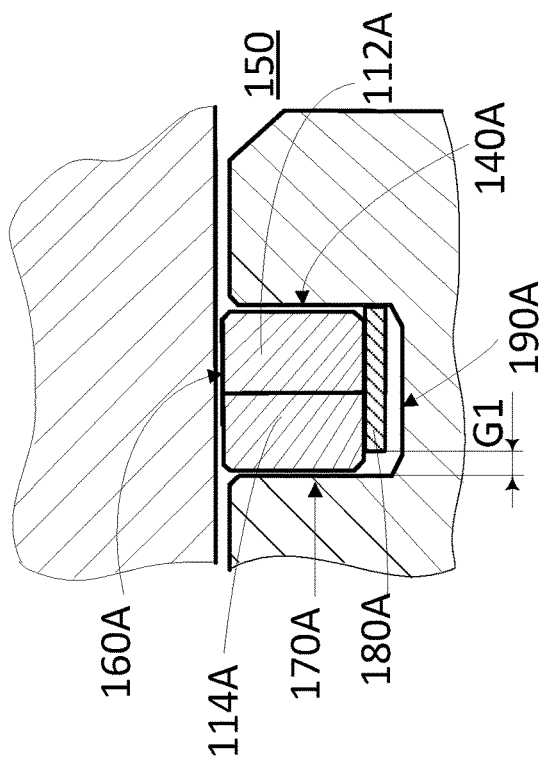
Figure 4C:
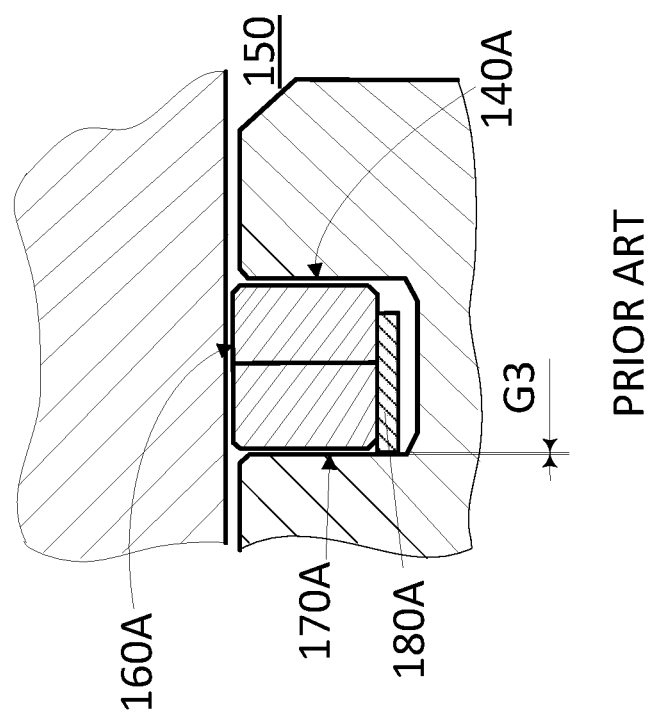

For reciprocating pumps that comprise a piston which reciprocates within a cylinder and has at least one least seal assembly comprising a seal energizer and a seal which seals the interface between the piston and the cylinder wall, it has been found that the axial position of the seal energizer within the piston groove determines the size of the leakage area through the seal which affects the pressure drop across the seal. As illustrated in FIG. 4A, which shows a piston assembly comprising seal 160A and seal energizer 180A positioned in piston groove 190A, if seal energizer 180A is positioned closer to the groove wall 140A that is closer to the higher pressure side of the piston, which is the side closer to the compression chamber 150, the leak path between the seal energizer and the groove wall 170A, which is closer to the low pressure side of the piston, allows a bigger gap G1 and implicitly a larger leak area compared to leak path through the seal assembly when seal energizer 180A is positioned axially in the centre of groove 190A, as illustrated in FIG. 4B where gap G2 is smaller than G1, or if seal energizer 180A is positioned closer to groove wall 170A, as illustrated in FIG. 4C where gap G3 is the smallest. It was found that in order to have a consistent wear of the seal over time, or to have a consistent wear spread across a series of seals it is preferred to control the positioning of the seal energizer in the piston groove. Preferably the seal energizer is consistently positioned in the piston groove such that one of its lateral surfaces is in contact with the piston groove wall that is closer to the lower pressure side of the piston which allows the smallest leak path area for any fluid leaking from the high pressure side of the piston, as illustrated in FIG. 4C.

Figure 5A:
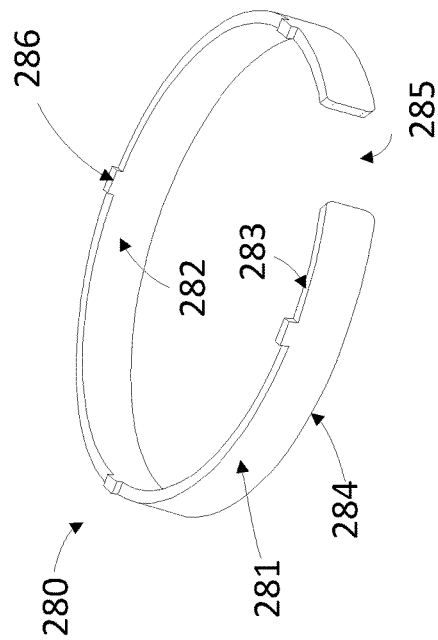
FIG. 5A is a view of a seal energizer according to a first embodiment and FIG. 5B is a cross-sectional view of the piston seal assembly comprising the seal energizer illustrated in FIG. 5A, positioned in a piston groove.
Figure 5B:
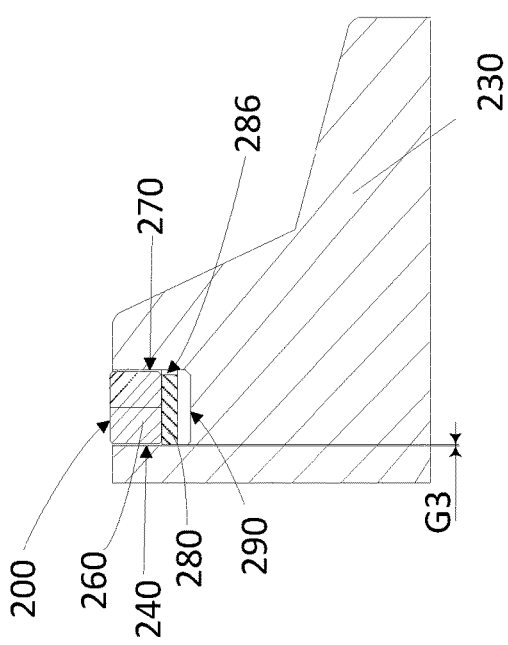

A first embodiment of the present seal energizer and seal assembly is illustrated in FIGS. 5A and 5B. Seal energizer 280 is in the shape of a split ring comprising an outer circumferential surface 281, an inner circumferential surface 282, a first lateral surface 283 and a second lateral surface 284, adjoining the outer and inner circumferential surfaces and it comprises a gap 285 between the free ends of the split ring. Piston seal assembly 200 comprises seal 260 and seal energizer 280 whose outer circumferential surface 281 supports seal 260. Piston seal assembly is installed in piston groove 290 of piston 230. Seal 260 is generally a split seal and more particularly an S-cut seal as shown in FIGS. 2 and 3. In this first embodiment, first lateral surface 283 of seal energizer 280 is provided with a plurality of tabs 286 extending in a direction perpendicular to the first lateral surface and positioned at predetermined spaced intervals along the first lateral surface of seal energizer 280. FIG. 5A illustrates a seal energizer with four tabs 286 spaced evenly along first lateral surface 283 of the seal energizer. A person skilled in the art would understand that the seal energizer can be provided with any number of tabs, including just one tab. In preferred embodiments there are at least three tabs equally spaced along the first lateral surface of the seal energizer so that the tabs ensure a stable axial position of the seal energizer within the piston groove as illustrated in FIG. 5B and as further explained below.

Seal energizer 280 is placed in piston groove 290 with its first lateral surface 283 which is provided with tabs 286 facing groove wall 270 that is closer to compression chamber 250 which is the higher pressure side of piston 230; and facing away from groove wall 240 that is closer to the lower side of the piston. Because only tabs 286 come in contact with wall 270 of the piston groove the manufacturing tolerance requirements for the first lateral surface of the seal energizer are less strict and only the surfaces of the tabs that are facing the groove wall need to be manufactured within tight tolerances to ensure a fixed axial position of the energizer within the piston groove. The axial positioning of the seal energizer within the piston groove illustrated in FIG. 5B achieves a similar result with the one illustrated in FIG. 4C, such that this arrangement ensures a reduced leak path area, corresponding to gap G3. The majority of the fluid leaking from the compression chamber on the high pressure side of piston 230 escapes by flowing into the bottom of the piston groove underneath seal energizer 280 and is substantially blocked from passing the seal assembly towards the low pressure side of the piston. The height and width of tabs 286 are dimensioned to control the leakage through the piston seal assembly and to ensure a stable positioning of the seal energizer in a fixed position within the piston groove. Tabs 286 are illustrated having a rectangular shape, but they can have a rounded or semicircular shape or any other shape that allows an appropriate contact surface with the wall of the piston groove where the seal energizer is positioned.

Figure 6A:
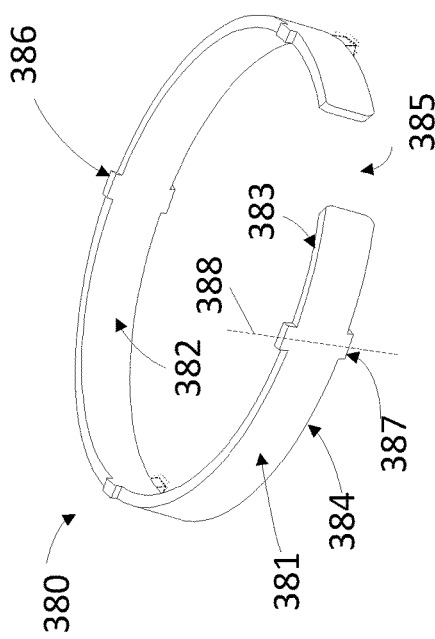
FIG. 6A is a view of a seal energizer according to a second embodiment and FIG. 6B is a cross-sectional view of the piston seal assembly comprising the seal energizer illustrated in FIG. 6A, positioned in a piston groove.
Figure 6B:
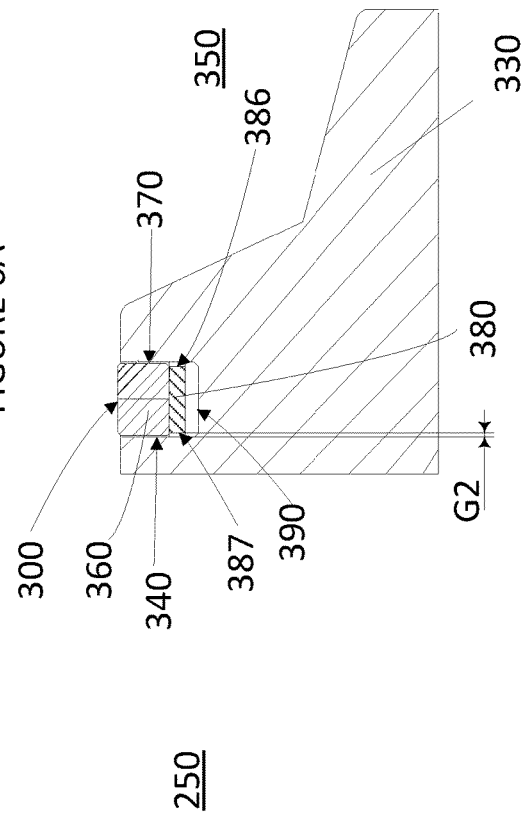

A second embodiment of the seal energizer and of the seal assembly is illustrated in FIGS. 6A and 6B. Seal energizer 380 has the shape of split ring comprising an outer circumferential surface 381, an inner circumferential surface 382, a first lateral surface 383 and a second lateral surface 384, adjoining the outer and inner circumferential surfaces and it comprises a gap 385 between the free ends of the split ring. Piston seal assembly 300 comprises a seal 360 and seal energizer 380 whose outer circumferential surface 381 supports the seal, and is installed in piston groove 390 of piston 330. Seal 360 is generally a split seal or an S-cut seal that can have the shape illustrated in FIGS. 2 and 3. In this second embodiment, first lateral surface 383 of seal energizer 380 is provided with a plurality of tabs 386 extending in a direction perpendicular to the first lateral surface 383 and a plurality of tabs 387 extending in a direction perpendicular to the lateral surface 384. FIG. 6A illustrates a seal energizer with four tabs 386 spread evenly along first lateral surface 383 of the seal energizer and with four tabs 387, with each tab 387 having its axis aligned with the axis of its corresponding tab 386, such that they substantially share a common axis 388. A person skilled in the art would understand that the seal energizer can be provided with any number of tabs, including only one tab on each of the lateral surfaces of the seal energizer and that preferably it comprises at least three tabs 386 equally spaced along the first lateral surface of the seal energizer and at least three corresponding tabs 387 spaced along the second lateral surface of the seal energizer. The tabs on one lateral surface of the seal energizer don't have to be aligned with the tabs on the other lateral surface of the seal energizer as long as they are distributed to ensure a stable position of the seal energizer within the piston groove.

As illustrated in FIG. 6B, seal energizer 380 is placed in piston groove 390 with first lateral surface 383 provided with tabs 386 facing groove wall 370 that is closer to compression chamber 350 and with second lateral surface 384 provided with tabs 387 facing groove wall 340 that is closer to the lower side of the piston. In the illustrated embodiment, since the tabs are evenly distributed on both lateral surfaces of the seal energizer and because they have equal dimensions there is no particular preference in regards to which lateral surface is facing each side of piston 330. In other embodiments, tabs 387 can have a different width and depth than tabs 386 and preferably tabs 387 on the lateral surface of the seal energizer that is closer to the lower pressure side of the piston have a smaller height than the tabs on the other lateral surface of the seal energizer to minimize the leak path area through gap G2. Because only tabs 386 and 387 come in contact with wall 370 and respectively wall 340 of the piston groove, the manufacturing tolerance requirements for the lateral surfaces of the seal energizer are less strict and only the surfaces of the tabs that are facing the groove wall need to be manufactured within tight tolerances. Especially tabs 387 which contact wall 340 closer to the lower pressure side of the pump have to have a tightly controlled height because their height controls the size of gap G2. The axial positioning of the seal energizer within the piston groove illustrated in FIG. 6B is similar with the one illustrated in FIG. 4B. The leak path area corresponding to gap G2 in this second embodiment is slightly larger than the leak path area corresponding to gap G1 illustrated in FIG. 5B, but this second embodiment can enable an easier installation and assembly process of the seal assembly, while maintaining a controlled leak through the seal assembly. Tabs 386 and 387 are illustrated having a rectangular shape, but they can also have a rounded or semicircular shape or any other shape that allows an appropriate contact surface with the wall of the piston groove where the seal energizer is positioned.

Figure 7B:
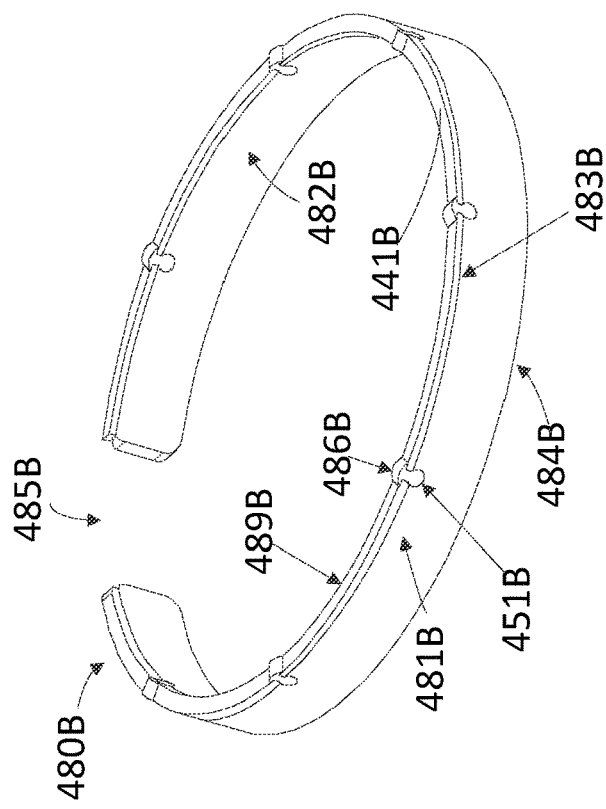
FIGS. 7A and 7B show views of two embodiments of a seal energizer provided with tabs which are inserted in corresponding notches on the lateral surface of the seal energizer.
Figure 7A:
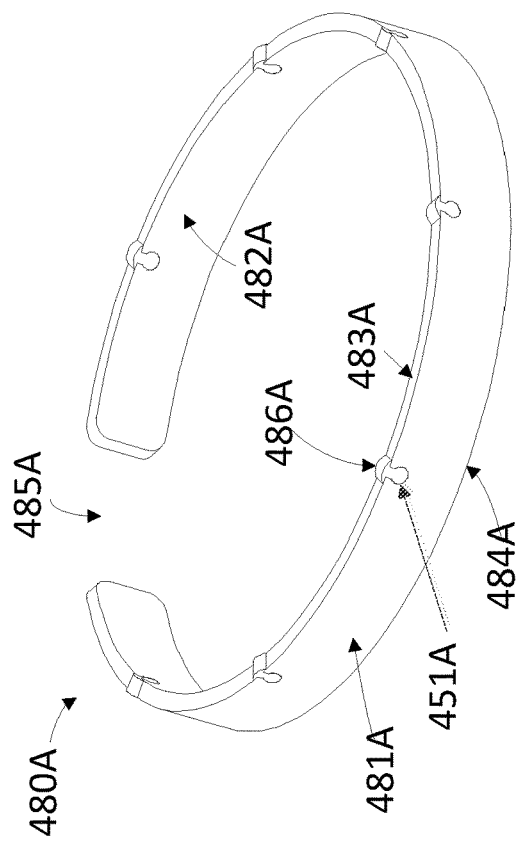

FIG. 7A illustrates a third embodiment of the seal energizer. Seal energizer 480A has a similar construction with the seal energizer of the first embodiment illustrated in FIG. 5A. It has the shape of split ring comprising an outer circumferential surface 481A, an inner circumferential surface 482A, a first lateral surface 483A and a second lateral surface 484A, adjoining the outer and inner circumferential surfaces and it comprises a gap 485A between the free ends of the split ring. First lateral surface 483A of seal energizer 480A is provided with a plurality of tabs 486A extending in a direction perpendicular to the first lateral surface and positioned at predetermined spaced intervals along the first lateral surface of the seal energizer. FIG. 7 illustrates a seal energizer with seven tabs 486A spread evenly along first lateral surface 483A of the seal energizer. A person skilled in the art would understand that the seal energizer can be provided with any number of tabs and that preferably it comprises at least three tabs equally spaced along the first lateral surface of the seal energizer so that the tabs ensure a stable axial position of the seal energizer within the piston groove. In this embodiment, tabs 486A which extend from surface 483A of the seal energizer are preferably made from a compliant material which has a low thermal expansion coefficient. The tabs are fitted into notches 451A provided in the first lateral surface 483A of the seal energizer and are illustrated as having a semicircular surface. The tabs can be injection molded into the notches provided in the seal energizer or they can be manufactured separately by any method known in the art and then inserted into the corresponding notches provided in the seal energizer. The tabs can be made of the same material as the seal energizer or of a softer, more elastic material than the material of the seal energizer, for example an elastomeric or a plastic material. A person skilled in the art would understand that tabs 486A can have a rectangular shape, similar with the tabs illustrated in FIG. 5A, or any other shape that allows an appropriate contact surface with the wall of the piston groove where the seal energizer is positioned.

Seal energizer 480A is placed in a piston groove in a similar way as the seal energizer 280 of the first embodiment, as illustrated in FIG. 5B. When the seal energizer is positioned within the piston groove, first lateral surface 483A provided with tabs 486A faces the groove wall that is closer to the higher pressure side of the pump piston. Because tabs 486A are made of a compliant material there is no requirement regarding tight manufacturing tolerances of the tabs. When the seal energizer is positioned within the piston groove the tabs are pressed against the wall of the groove thereby positioning the seal energizer in a fixed axial position within the groove. The axial positioning of the seal energizer within the piston groove is similar with the one illustrated in FIG. 5B and such arrangement ensures a reduced leak path area through the piston seal assembly.

In the embodiment illustrated in FIG. 7B lateral surface 483B of seal energizer 480B is provided with notches 451B and seal energizer 480B comprises a component 489B which is provided with tabs 486B, fitted in these notches, and with connecting portions 441B between these tabs. It has the shape of a split ring comprising an outer circumferential surface 481B, an inner circumferential surface 482B, a first lateral surface 483B and a second lateral surface 484B, adjoining the outer and inner circumferential surfaces and it comprises a gap 485B between the free ends of the split ring. Component 489B can be manufactured separately by any method known in the art, and then fitted on the lateral surface 483B of the seal energizer with tabs 486B inserted in notches 451B. Component 489B can be made of the same material as the seal energizer or of softer, more elastic material than the material of the seal energizer, for example an elastomeric or plastic material.

The fourth embodiment of the seal energizer is illustrated in FIG. 8A. Seal energizer 580 has the shape of split ring comprising an outer circumferential surface 581, an inner circumferential surface 582, a first lateral surface 583 and a second lateral surface 584, adjoining the outer and inner circumferential surfaces and it comprises a gap 585 between the free ends of the split ring. In this embodiment the first and second lateral surfaces of the seal energizer are curved the curvature of these two surfaces being defined by an angle α and respectively β. Angles α and β are the angles defined by the respective lateral surface of the seal energizer and a straight planar surface perpendicular on the axis A-A of the seal energizer. In the embodiment illustrated in FIG. 8A the two curvatures of the first lateral surface 583 and respectively of the second lateral surface 584 are equal (α=β). In other embodiments the two curvatures can be different and should be calculated such that the seal energizer is kept in the fixed position within the piston groove.

Like in the other embodiments, in this fourth embodiment piston seal assembly 500 comprises seal 560 and seal energizer 580 whose outer circumferential surface 581 supports the seal and is installed in piston groove 590 of piston 530. Seal 560 is generally a split seal that can have an S-cut as illustrated in FIGS. 2 and 3. Seal energizer 580 is preferably positioned within piston groove 590 such that in the area of the S-cut, more specifically in the area where the free ends of the seal are overlapping, second lateral surface 584 comes into contact with groove wall 540, as illustrated in FIG. 8B. The axial positioning of the seal energizer within the piston groove, illustrated in FIG. 8B, achieves a similar result with the one illustrated in FIG. 4C, and this arrangement ensures that the leak path area, corresponding to gap G3, is smaller than that of gap G4 which is the gap between first lateral surface 583 of the seal energizer and groove wall 570 that is closer to the high pressure side 550 of the piston due to the curvature of the lateral surfaces of the seal energizer. The majority of the fluid leaking from the high pressure side of piston 530 by seal 560 and reaching the bottom of piston groove underneath seal energizer 580 will be substantially blocked from passing the seal assembly towards the lower pressure side of the piston, opposite to compression chamber 550.

FIG. 8C illustrates the position of the seal energizer in a cross-section through the piston seal assembly along a plane that is positioned at a 90 degree angle relative to the cross-sectional view illustrated in FIG. 8B. As seen here, first lateral surface 583 comes into contact with groove wall 570 that is closer to the high pressure side 550 of the piston. In this section of the piston seal assembly, the leak path between the seal energizer and the groove wall 540 that is closer to the low pressure side of the piston allows a bigger gap G1 and implicitly a larger leak area, but this portion of the seal energizer is not positioned underneath the area where the free ends of the seal are overlapping and where the potential of fluid leaking past the seal assembly is higher.

In this embodiment it is preferred to have a fixed relative position between seal energizer 580 and seal 560 such that the reduced leak area through the piston seal assembly corresponds to the area where the free ends of the seal are overlapping.

Figure 9A:
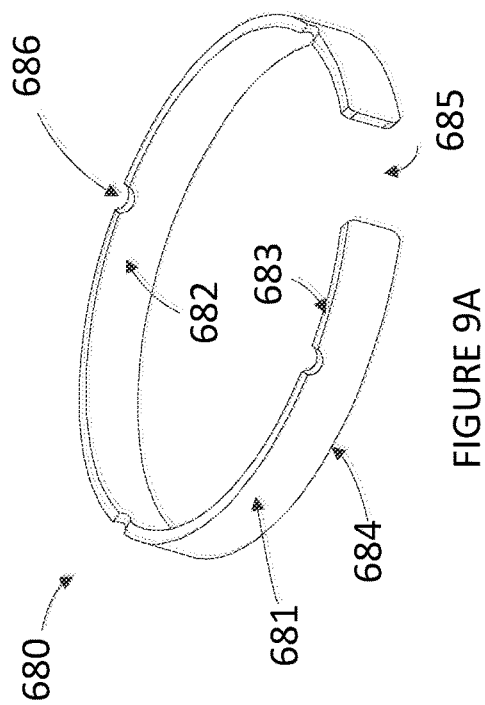
FIG. 9A is a view of a seal energizer according to a fifth embodiment of the present disclosure and FIG. 9B is a cross-sectional view of the piston seal assembly comprising the seal energizer illustrated in FIG. 9A, positioned in a piston groove.
Figure 9B:
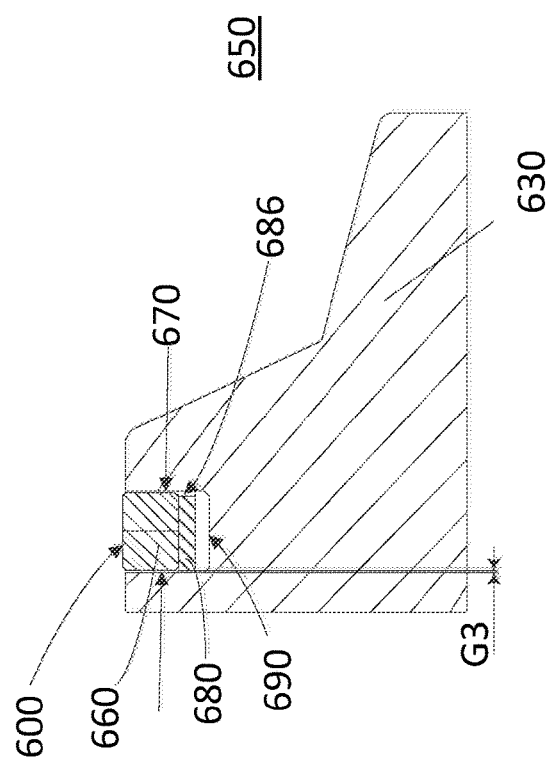

A fifth embodiment of the seal energizer and of the seal assembly is illustrated in FIGS. 9A and 9B. Seal energizer 680 has the shape of split ring comprising an outer circumferential surface 681, an inner circumferential surface 682, a first lateral surface 683 and a second lateral surface 684, adjoining the outer and inner circumferential surfaces and it comprises a gap 685 between the free ends of the split ring. Piston seal assembly 600 comprises seal 660 and seal energizer 680 whose outer circumferential surface 681 supports the seal and is installed in piston groove 690 of piston 630. Seal 660 is generally a split seal or an S-cut seal that can have the shape illustrated in FIGS. 2 and 3. In this first embodiment, first lateral surface 683 of seal energizer 680 is provided with a plurality of recesses 686 positioned at predetermined intervals along the first lateral surface of the seal energizer. FIG. 9A illustrates a seal energizer with four recesses 686 spread evenly along first lateral surface 683 of the seal energizer. A person skilled in the art would understand that the seal energizer can be provided with a different number of recesses, with at least one recess being provided on one of the lateral surfaces of the seal energizer. The recesses illustrated in FIG. 9A have a semicircular shape, but a person skilled in the art would recognize that the recesses provided on the surface of the seal energizer can be of any other shapes.

Seal energizer 680 is placed in piston groove 690 with first lateral surface 683 provided with recesses 686 facing groove wall 670 that is closer to compression chamber 650. In this embodiment, the manufacturing tolerance requirements for the first and second lateral surfaces of the seal energizer are stricter to ensure a fixed axial position of the energizer within the piston groove. Also, the depth of the recesses on the lateral surface of the seal energizer closer to the higher pressure side of the piston has to be controlled through manufacturing tolerances to be more precise such that it allows a better control of the leak area through the piston seal assembly. The axial positioning of the seal energizer within the piston groove illustrated in FIG. 9B achieves a similar result with the one illustrated in FIG. 4C, ensuring a reduced leak path area, corresponding to gap G3. The majority of the fluid leaking from the high pressure side of piston 630, passing along the first lateral surface of seal 660 through recesses 686 and reaching the bottom of piston groove underneath seal energizer 680 will be substantially blocked from passing the seal assembly towards the lower side of the piston.

Figure 10B:
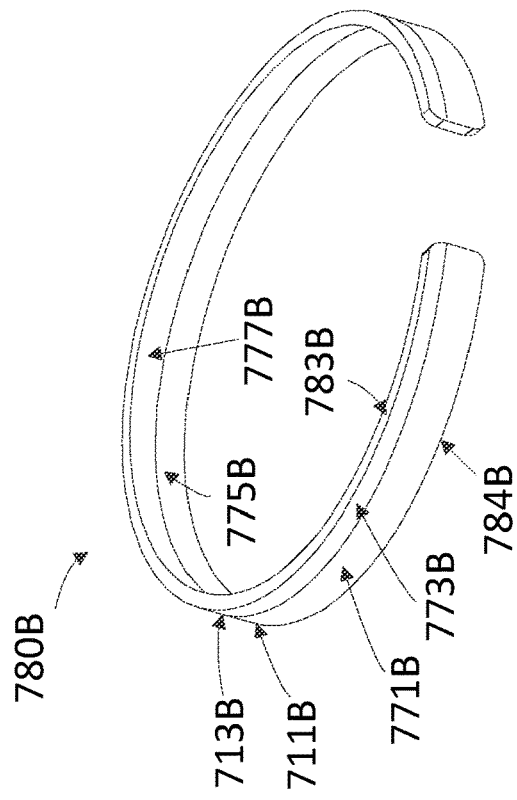
FIGS. 10A and 10B show views of two embodiments of a seal energizer made of two parts.
Figure 10A:
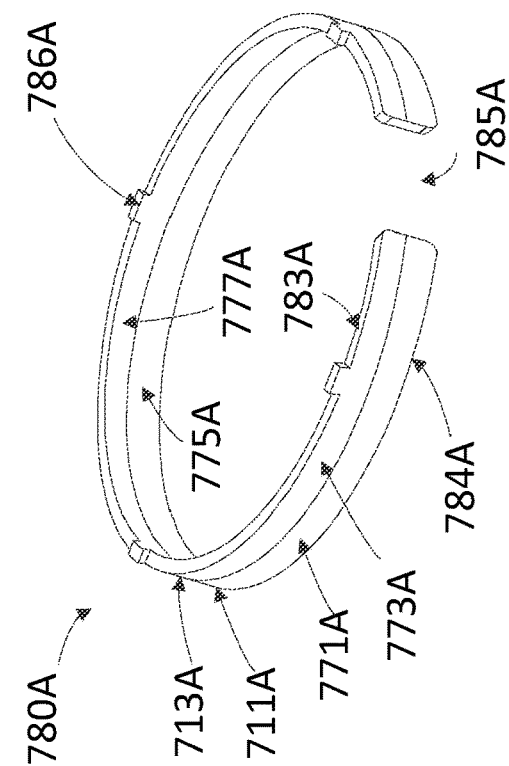

FIGS. 10A and 10B show the views of another embodiments of a seal energizer disclosed here. Seal energizer 780A made of two parts 711A and 713A which are positioned next to each other and share a common longitudinal axis when the seal energizer is placed in a piston groove. First part 711A has an outer circumferential surface 771A and an inner circumferential surface 775A and second part 713A has an outer circumferential surface 773A and an inner circumferential surface 777A which form together the outer circumferential surface of the seal energizer with gap 785A which supports the seal of the piston seal assembly and respectively the inner circumferential surface of the seal energizer which faces the piston groove wall when seal energizer 780A is placed in the piston groove. Part 713A has a lateral surface which is the first lateral surface 783A of the seal energizer and it is shaped to position the seal energizer in a fixed axial position within the piston groove. In FIG. 10A first lateral surface 783A is provided with several tabs 786A which extend in a direction perpendicular to the first lateral surface such that when seal energizer 780A is placed in a piston groove tabs 786A are in contact with a wall of the piston groove to position the seal energizer in a fixed axial position within the piston groove in a similar manner as illustrated in FIG. 5B and explained in more detail in relation to the first embodiment of the present disclosure.

A person skilled in this technology would understand that seal energizer 780A can have a shape similar to the one illustrated in FIG. 6A where both the first lateral surface 783A and the second lateral surface 784A can be provided with tabs and that in this variant seal energizer 780A could be made, for example, of two or three parts having a common longitudinal axis when positioned next to each other in the piston groove.

In another embodiment illustrated in FIG. 10B seal energizer 780B is made of two parts 711B and 713B which are positioned next to each other and share a common longitudinal axis when the seal energizer is placed in a piston groove. Like components between this embodiment and the embodiment illustrated in FIG. 10A have like reference numerals and may not be described in detail if at all. In the present embodiment, part 713B is made of a more compliant material than the material of part 711B, for example an elastomeric or plastic material, and it is dimensioned to position seal energizer 780B in a fixed axial position within the piston groove. Since second part 713B is made of a more compliant material, the tolerances for first lateral surface 783B of the seal energizer are less strict and, at the same time, second part 713B is dimensioned such that seal energizer 780B fits tightly within the piston groove and thereby positions the seal energizer in a fixed axial position within the piston groove.

Another embodiment of the present piston seal assembly is illustrated in FIG. 11. In this embodiment seal piston assembly 800 comprises seal 860, seal energizer 880 and spacer 889, whereby spacer 889 is positioned in piston groove 890 next to seal energizer 880. Spacer 889 is made of a different material than energizer 880, preferably of a more compliant material, for example an elastomeric or a plastic material and it is dimensioned such that it fits tightly between seal energizer 880 and wall 870 of piston groove 890 to thereby position the seal energizer in a fixed axial position within the piston groove. Spacer 889 can be in the shape of a ring.

Yet another embodiment of the present piston seal assembly can comprise a spring instead of the spacer illustrated in FIG. 11. This embodiment is illustrated in FIG. 12 which shows the view of a seal energizer 980 and a spring 989 positioned next to the seal energizer within piston groove 990. In this view, the seal of the piston is not illustrated, but a person skilled in the art would understand that the relative positioning of the seal, the spring and the seal energizer is similar with the one illustrated in FIG. 11. Due to the elastic properties of its material, spring 989 that is inserted in the piston groove between the seal energizer and the wall of the piston groove positions seal energizer 980 in a fixed axial position within piston groove 990.

Figure 13:
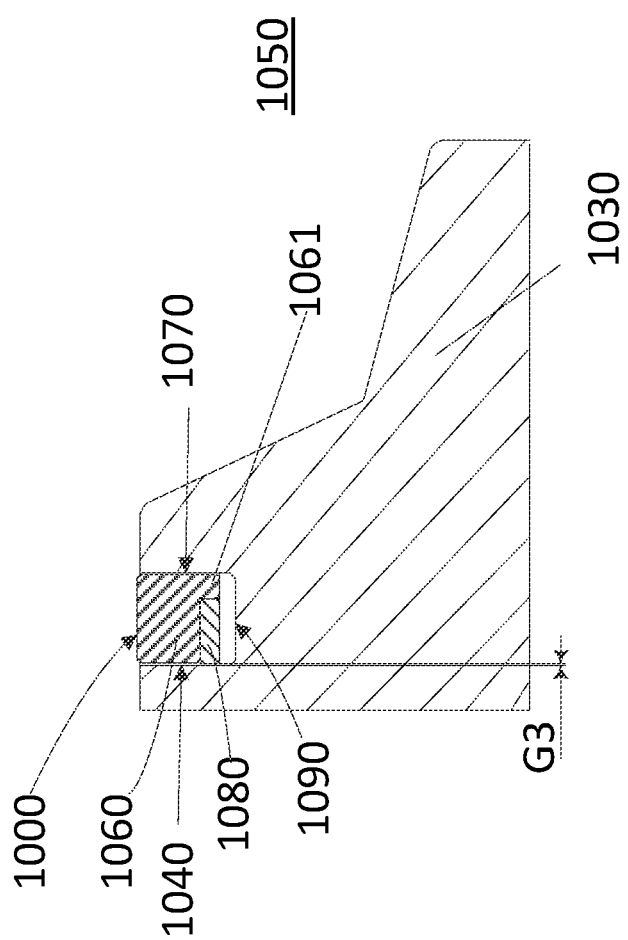
FIG. 13 shows a schematic cross-sectional representation of a piston seal assembly according to another embodiment of the present disclosure, comprising a seal that has a portion which protrudes between seal energizer and a wall of the piston groove where the seal assembly is located.

FIG. 13 illustrates an embodiment of piston seal assembly 1000 comprising a seal energizer 1080 which supports a seal 1060 within piston groove 1090. In this embodiment seal 1060 comprises a portion 1061 which protrudes between seal energizer 1080 and wall 1070 of piston groove 1090. Because portion 1061 of the seal is made of a more elastic material than the seal energizer and because it is dimensioned to fit tightly between the seal energizer 1080 and wall 1070 of the piston groove it positions seal energizer 1080 in a fixed axial position within the piston groove.

The embodiments illustrated in FIGS. 12 and 13 allow a similar positioning of the seal energizer as the embodiment illustrated in FIG. 5B, ensuring a reduced leak path area, corresponding to gap G3.

In the illustrated embodiments the seal which is part of the piston seal assembly is a seal in the shape of a split cut seal having two overlapping ends as illustrated in FIGS. 2 and 3.

The figures in the present disclosure are schematic representations of the disclosed reciprocating pump and piston seal assembly and are not drawn to scale. For example, some features such as for example the gaps G1, G2 and G3 between the lateral surfaces of the seal energizer and the piston groove walls may be enlarged relative to the other components to better illustrate their function and their relative dimensions. In addition, these schematic representations do not show all the physical details of the reciprocating pump and the piston seal assemblies.

In the figures of the present disclosure like components between different embodiments have like reference numerals and may have not been described in detail, if at all.

The present invention has been described with regard to a plurality of illustrative embodiments. However, it will be apparent to persons skilled in the art that a number of variations and modifications can be made without departing from the scope of the invention as defined in the claims.

We claim:

1. A piston seal assembly for sealing between a piston and a cylinder bore, said piston seal assembly being disposed in a circumferential piston groove and comprising a seal and a radial seal energizer, said radial seal energizer comprising an outer circumferential surface of substantially constant radius and an inner circumferential surface of substantially constant radius, each circumferential surface defined in part by an upper edge and a lower edge respectively, said outer and inner circumferential surfaces being joined at their upper edges by a first lateral surface and joined at their lower edges by a second lateral surface, wherein said outer circumferential surface of said seal energizer provides substantially radial support to said seal in said circumferential piston groove and wherein at least one of said first lateral surface and said second lateral surface of said seal energizer is shaped to position said seal energizer in a fixed axial position within said circumferential piston groove and to provide a controlled leak path.

2. The piston seal assembly of claim 1 wherein said first lateral surface of said seal energizer is provided with at least one tab extending in a direction perpendicular to said first lateral surface.

3. The piston seal assembly of claim 2 wherein said second lateral surface of said seal energizer is also provided with at least one tab extending in a direction perpendicular to said second lateral surface.

4. The piston seal assembly of claim 2 wherein an axis of said at least one tab extending from said first lateral surface in a direction perpendicular to a circumferential direction of said seal energizer is aligned with an axis of a corresponding at least one tab from said second lateral surface.

5. The piston seal assembly of claim 2 wherein said energizer is located in said groove with said tabs being in contact with a wall of said circumferential piston groove which is closer to a compression chamber defined in said cylinder bore.

6. The piston seal assembly of claim 1 wherein said first lateral surface of said seal energizer is provided with at least one recess.

7. The piston seal assembly of claim 1 wherein said first lateral surface of said seal energizer is provided with a plurality of recesses positioned at predetermined spaced intervals on said first lateral surface.

8. The piston seal assembly of claim 1 wherein said seal energizer is made of at least two radial parts each having the substantially constant radius of said outer circumferential surface and share a common longitudinal axis, said at least two radial parts positioned next to each other in said circumferential piston groove to thereby form said outer circumferential surface, said first lateral surface and respectively said second lateral surface of said energizer and wherein at least one of said first and said second lateral surface of said seal energizer is shaped to position said seal energizer in a fixed axial position within said circumferential piston groove.

9. The piston seal assembly of claim 1 wherein said seal comprises a portion which protrudes between said seal energizer and a wall of said circumferential piston groove and wherein said portion of said seal is dimensioned to position said seal energizer in a fixed axial position within said circumferential piston groove.

10. The piston seal assembly of claim 1 wherein said piston seal assembly is used for sealing between said piston and said cylinder bore of a pump which compresses cryogenic fluids at pressures higher than 3000 psi.

11. A radial seal energizer for supporting a seal in a circumferential piston groove of a piston that is reciprocable in a cylinder, said seal energizer comprising an outer circumferential surface of substantially constant radius and an inner circumferential surface of substantially constant radius, each circumferential surface defined in part by an upper edge and a lower edge respectively, said outer and inner circumferential surfaces being joined at their upper edges by a first lateral surface and joined at their lower edges by a second lateral surface, wherein said outer circumferential surface is adapted to provide substantially radial support to said seal and at least one of said first lateral surface and said second lateral surface is shaped to position said seal energizer in a fixed axial position within said circumferential piston groove and to provide a controlled leak path.

12. The seal energizer of claim 11 wherein said seal energizer has the shape of a split ring.

13. The seal energizer of claim 11 wherein said first lateral surface of said seal energizer is provided with at least one tab extending in a direction perpendicular to said first lateral surface.

14. The seal energizer of claim 13 wherein said second lateral surface of said seal energizer is also provided with at least one tab extending in a direction perpendicular to said second lateral surface.

15. The seal energizer of claim 11 wherein said first lateral surface of said seal energizer is provided with a plurality of tabs extending in a direction perpendicular to said first lateral surface, said tabs being positioned at predetermined spaced intervals on said first lateral surface.

16. The seal energizer of claim 15 wherein said second lateral surface of said seal energizer is also provided with a plurality of tabs extending in a direction perpendicular to said second lateral surface, said tabs being positioned at predetermined spaced intervals on said second lateral surface.

17. The seal energizer of claim 16 wherein there are an equal number of said tabs associated with said first lateral surface and said second lateral surface.

18. The seal energizer of claim 17 wherein an axis of each of said tabs on said first lateral surface in a direction perpendicular to a circumferential direction of said seal energizer is aligned with an axis of a corresponding tab from said tabs on said second lateral surface.

19. The seal energizer of claim 11 wherein said first lateral surface of said seal energizer is provided with at least one recess.

20. The seal energizer of claim 11 made of at least two radial parts each having the substantially constant radius of the outer circumferential surface and share a common longitudinal axis when positioned next to each other in said circumferential piston groove to thereby form said outer circumferential surface, said first lateral surface and respectively said second lateral surface of said energizer and wherein at least one of said first and said second lateral surface of said seal energizer is shaped to position said seal energizer in a fixed axial position within said circumferential piston groove.

* * * * *